No. 774,807. PATENTED NOV. 15, 1904.
C. S. WHEELWRIGHT.
PROCESS OF COOKING GARBAGE, &c., AND REMOVING THE OIL, &c., THEREFROM.
APPLICATION FILED NOV. 12, 1903.
NO MODEL. 2 SHEETS—SHEET 1.
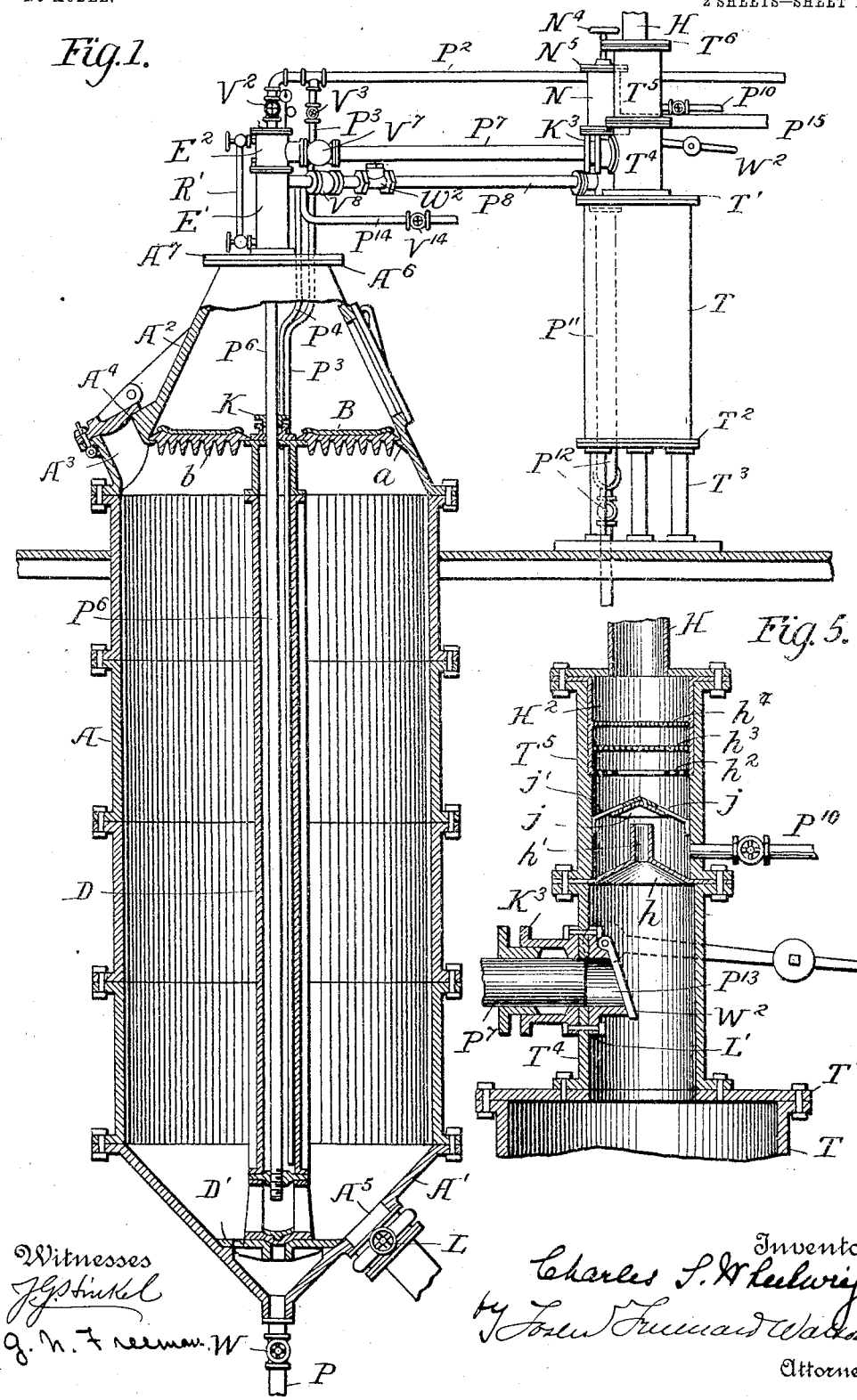

No. 774,807. PATENTED NOV. 15, 1904.
C. S. WHEELWRIGHT.
PROCESS OF COOKING GARBAGE, &c., AND REMOVING THE OIL, &c., THEREFROM.
APPLICATION FILED NOV. 12, 1903.
NO MODEL. 2 SHEETS—SHEET 2.

Witnesses
Inventor
Charles S. Wheelwright
Attorneys

No. 774,807.

Patented November 15, 1904.

UNITED STATES PATENT OFFICE.

CHARLES S. WHEELWRIGHT, OF BRISTOL, RHODE ISLAND.

PROCESS OF COOKING GARBAGE, &c., AND REMOVING THE OIL, &c., THEREFROM.

SPECIFICATION forming part of Letters Patent No. 774,807, dated November 15, 1904.

Application filed November 12, 1903. Serial No. 180,919. (No specimens.)

*To all whom it may concern:*

Be it known that I, CHARLES S. WHEELWRIGHT, of Bristol, in the State of Rhode Island, have invented a new and useful Method or Process of Cooking Garbage or Offal and Removing the Oil Therefrom, of which the following is a specification.

The invention is of the same general character as an invention described in Letters Patent No. 709,836, granted to me for the same purpose, employing a central heater in the cooker or digester; but in practicing the present invention instead of waiting until the garbage is cooked before removing the oil therefrom I mostly remove the oil while the cooking is in process, supplying the place of the extracted oil in the digester either by direct steam and water of circulation or by water injected into the digester by the injector or by water from an ordinary force-pump, as will be hereinafter more fully explained.

The present invention consists in cooking the garbage or offal by direct steam introduced into the body of said garbage or offal and by radiation from a central heater in the vessel in which direct steam is introduced separating continuously from said garbage or offal by the increasing volume of water in said digester and mechanical means for holding back the solid parts from the lifting action of said increasing volume of water the oil or grease extracted from said garbage or offal by said cooking and depositing the same and accompanying water in a trapped chamber, conveying continuously the oil or melted grease and accompanying water from said trapped chamber to a separating trapped chamber and regulating the flow of the oil or melted grease from said separating trapped chamber by the height of a column of water in a vessel connected with the bottom of said separating trapped chamber.

The invention consists, further, in the combination of details of said method or process.

I proceed to describe an apparatus by which my improved method or process may be put in operation.

Figure 3:
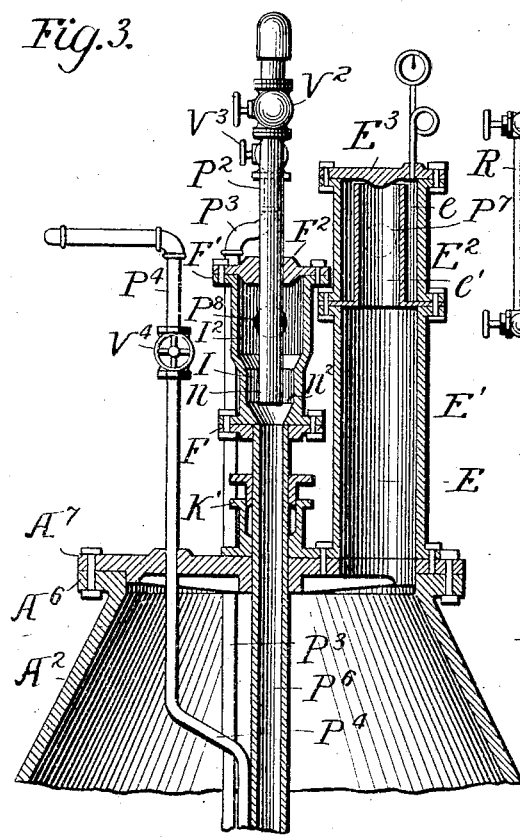
Figure 2:
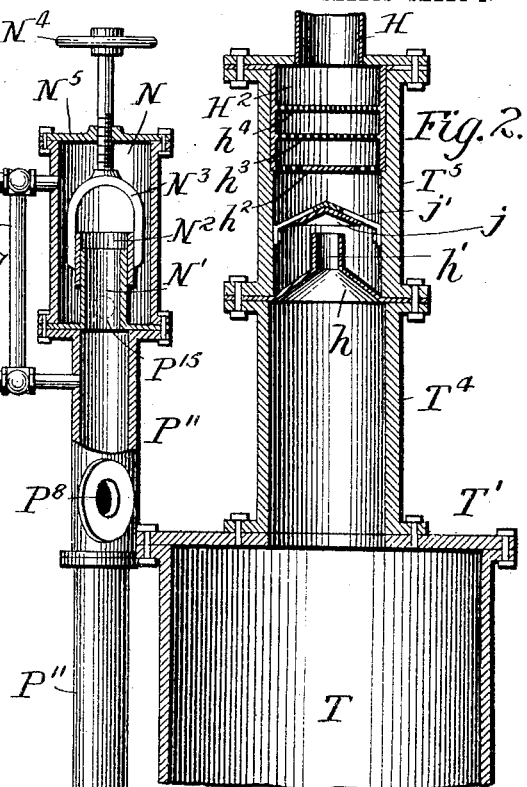
Figure 4:
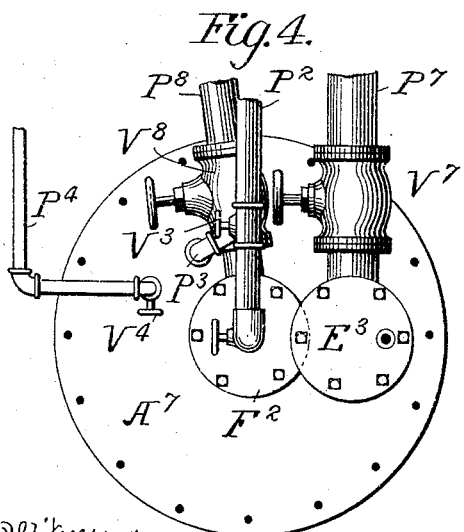

In the drawings, Figure 1 is a front elevation of the apparatus, the digester being in section. Fig. 2 is a sectional elevation, on an enlarged scale, of chambers T, $T^4$, and $T^5$. Fig. 3 is a sectional elevation of parts supported on the cover to the digester. Fig. 4 is a plan of the same. Fig. 5 is an elevation showing the construction and arrangement of the flow-pipe and flow-box.

A is the digester, formed in sections bolted together substantially as in my said Patent No. 709,836.

D is the central heater, supported on a false bottom $D'$ in the lower conical section $A'$ of the digester and extending up into the upper conical section $A^2$, where, with a flange $a$ cast on the inner wall of the said conical section $A^2$, it in turn supports a filtering-strainer B with large hanging teats $b$, as in my said former patent.

The opening to the digester for receiving the charge of garbage is at $A^3$ in the side of the upper conical section $A^2$ below said strainer B, a suitable cover $A^4$ being furnished. The opening by which the garbage is removed after the oil has been extracted is at $A^5$ flush with the side of conical section $A'$ at the bottom of the digester, a suitable gate-valve L being provided.

P is a water-pipe from a hydrant communicating with the bottom of said digester, W being a valve therein.

The upper conical section of the digester is truncated, as shown, and is cast with a smooth top flange $A^6$, to which is secured, by suitable bolts and packing, a cover $A^7$, which supports the stand-pipe E, above mentioned, opening freely or with its full diameter into said digester and of sufficient size to serve as a continuation of the same. The system of steam and water pipes for keeping up a circulation of water through the garbage at the final drawing off of the oil is also closely connected with the said cover $A^7$ of the digester, as will presently be described.

$P^6$ is the main steam-pipe, through which direct steam for cooking is supplied, passing through the middle of central heating-cylinder D and through packing at the bottom of said cylinder and provided with a deflector, as in my former patent.

A suitable packing-box K is provided at the upper end of said central heater D for said main steam-pipe $P^6$. A similar packing-box $K'$ is provided for the same pipe $P^6$ in the said cover $A^7$. A live-steam pipe $P^3$ furnishes direct steam to the interior of the said central heater, and an exhaust-steam pipe $P^4$ is also provided for said central heater, both as in my said former patent. Pipe $P^4$ passes through the flange of the packing-box K and then being bent, as shown in Fig. 1, passes through the cover $A^7$ of the truncated digester communicating with the open air or any hot-water receptacle, suitable packings being provided. It has a valve $V^4$. Pipe $P^3$ passes through the flange of the packing-box K and cover $A^7$ and communicates with steam-pipe $P^2$, in turn communicating with the boiler. (Not shown.) It has a valve $V^3$. The injector I is so placed as to form a continuation of said steam-pipe $P^2$, leading from the boiler, and sends its steam through its nozzle directly into said pipe $P^6$, which extends above the packing-box $K'$ and has screwed upon its extreme end a flange F, which is bolted to a corresponding flange of the shell of the injector I, as shown. The said shell of the injector has a similar top flange $F'$, to which in turn is bolted a cover $F^2$ to the injector, through which the pipe $P^2$ passes, as shown. The pipe $P^2$ has a valve $V^2$. The connection of pipe $P^3$ with pipe $P^2$ is such that the steam may be supplied to pipe $P^3$ when the valve $V^2$ is closed. The water-chamber of the injector I is shown at $I^2$ about the pipe $P^2$, the water-nozzle being at $n^2$. If there is no boiler-pressure in the digester, any water in the water-chamber $I^2$ of the injector will fall by gravity into pipe $P^6$. Return water or the water of circulation is supplied to the injector through pipe $P^8$, as hereinafter described. Pipe $P^8$ has an ordinary valve $V^8$ and a check-valve $w^2$.

E is the above-mentioned stand-pipe, being constructed in two parts of flanged castings $E'$ and $E^2$, bolted together, as shown. The lower casting $E'$ is bolted to cover $A^7$ about a hole in the cover of corresponding diameter, while to the upper casting $E^2$ is bolted a cover $E^3$. A brass casting $e'$, having its lower flanged edge secured between bolted flanges of $E'$ and $E^2$, extends up into $E^2$ from $E'$, thus forming a trapped chamber $e$. A circulating-pipe $P^7$, whose office will be presently described, leads from the trapped chamber $e$ in the casting $E^2$, formed around the part $e'$ of casting $E'$, which extends into $E^2$, forming the operative leg of a trap. The circulating-pipe $P^7$ has a valve $V^7$, and its farther end opens, as shown, into the water and oil receiving and separating apparatus, which will now be described.

The main part of said apparatus consists of a large tank T, the same being a circular casting with top and bottom ends $T'$ and $T^2$ bolted thereto, as shown. It is supported on posts $T^3$, so that its lower end is somewhat above the level of the bottom flange of the upper cone of the digester, while its upper end is somewhat above the level of the cover $A^7$ of the digester. In the top is a large opening, about which is bolted a flanged circular casting $T^4$ with its internal diameter equal to that of the said opening, and to the casting $T^4$ is bolted a similar casting $T^5$ of the same internal diameter, having a top cover $T^6$ bolted thereto, containing a chimney or ventilator H. A roof-shaped partition $h$, formed of copper, with a stand-pipe $h'$, separates the two chambers formed by the castings $T^4$ and $T^5$, the said partition and casting extending up into the casting or chamber $T^5$, so as to form the operative leg of a trap for said chamber $T^6$. This copper partition $h$ is held at its outer edges between the adjoining flanges of the castings $T^4$ and $T^5$. Inserted in the top of said casting or chamber $T^5$, with its upper edge held between the cover $T^6$ and the top flange of $T^5$, is, as shown, a copper baffler vessel $H^2$, having three bafflers $h^2$ $h^3$ $h^4$, whose office will be described hereinafter. So, too, supported by rods $j'$ $j'$, bolted within the chamber $T^5$, above the stand-pipe $h'$, is a deflector $j$ to turn back into the trapped chamber $T^5$ oil, together with such water as may be with the oil, issuing from the stand-pipe $h'$. $P^{10}$ is a pipe by which the contents of trapped chamber $T^5$ may be drawn to a receiving-tank below. (Not shown.) $P^{11}$ is a flow-pipe for water alongside of tank T, to the bottom of which it is connected, as shown, by a curved pipe $P^{12}$, whereby water from the water beneath the oil in tank T will stand in flow-pipe $P^{11}$ to substantially the level of the oil above the water in tank T and the tanks above said tank T, or, in other words, water in pipe $P^{11}$ balances water and oil in tank T $T^4$ and stand-pipe $h'$, and use is made of this fact, as will hereinafter appear, to regulate the flow of oil through said stand-pipe $h'$, and so on out of the apparatus.

The circulating-pipe $P^7$, above mentioned, enters the water and oil receiver at chamber $T^4$, a packing-box $K^3$ being provided for said pipe, as shown. Within the chamber $T^4$ is provided a short section of flanged piping $P^{13}$, having its flange $L'$ bolted to the inside of the chamber, so that the pipe proper, $P^{13}$, forms a continuation of pipe $P^7$.

$W^2$ is a weighted clapper-valve to prevent any undue rush of steam, water, and oil through pipe $P^7$. The office of the clapper-valve in connection with the trapped chamber $e$ is quite important. It is set to regulate the flow of water and oil from the digester to the receiver T $T^4$ at the pressure at which the digester may be operated, and if for a moment this pressure is not kept up the valve falls for an instant upon its seat and the oil already in the chamber remains there instead of following the receding water down the stand-pipe E.

The pipe $P^8$, mentioned above as the pipe through which the water of circulation is supplied to the water-chamber $I^2$ of the injector, is connected at its farther end with pipe $P^{11}$.

$P^{14}$ is a pipe from the hot-water tank (not shown) to pipe $P^8$, through which hot water may be introduced to the digester when required through the water-chamber of the injector and pipe $P^6$ by gravity, the said hot-water tank being above the level of the injector. It has a valve $V^{14}$, as shown, and enters the pipe $P^8$ on the injector side of the valve $V^8$.

The flow-pipe $P^{11}$ is supported by a post G. It is formed for convenience in two sections, and the upper section has bolted to it in turn a casting forming the shell of a flow-box N, which will now be described. A casting N', having its lower flanged edge secured between the bolted flanges of the two portions of flow-pipe $P^{11}$, as shown, extends up into the shell-casting N, forming a stand-pipe or operating-leg of a trap for the interior of said shell N, as shown. Closely fitting the outer walls of the stand-pipe N' is a ring valve or gate $N^2$, supported by a yoke $N^3$, which is moved up and down by a hand-wheel and screw $N^4$, moving through a cover $N^5$, bolted to the shell N. The ring valve or gate $N^2$ thus varies the length of the stand-pipe N' or the height to which water shall flow in flow-pipe $P^{11}$ before overflowing the walls of the stand-pipe, and thus regulates the flow of oil through stand-pipe h' into trapped chamber $T^5$ and through pipe $P^{10}$. It also determines the head or pressure under which water in pipe $P^{11}$ will flow through return circulation-pipe $P^8$ when valve $V^8$ is open. It also regulates the pressure at which water in the trapped shell N shall flow through the overflow-pipe $P^{15}$.

A water and oil gage R shows the condition of flow-pipe $P^{11}$, and another water and oil gage R' shows the condition of stand-pipe E and chamber e.

The operation is as follows: All valves are supposed to be closed. Valve W is opened and a suitable quantity of water admitted when the valve W is closed. The cover $A^4$ is taken off, a charge of garbage (one hundred and fifty barrels, more or less) dumped into the digester, and the cover is secured in place. If necessary, more water is added by opening valve $V^{14}$ in pipe $P^{14}$, leading from the hot-water tank, provided there be water in said tank remaining over from a previous operation of the apparatus. Valves $V^2$, $V^3$, and $V^4$ in pipes $P^2$, $P^3$, and $P^4$, respectively, are opened, and the cooking begins, valves $V^3$ and $V^4$ remaining open throughout the cooking, which continues for several hours, valve $V^2$ being closed from time to time. During the cooking, which continues for some eight hours, the interior of stand-pipe E may be considered as an extension of the digester, and it gradually becomes filled with oil and water apart from the garbage, and the oil and water pass over the upper end of the stand-pipe E into the chamber e, where they are trapped apart from the garbage. This is an essential feature of the present invention, since the effect of the garbage upon the oil which may have been extracted from it is deleterious, especially in the matter of color. Moreover, the oil is immediately removed from chamber e to the receiving-chambers T and $T^4$, &c., and no longer subjected to heat. The oil and water entering the receiving apparatus at casting or chamber $T^4$ through pipe $P^7$ falls by gravity into casting or chamber T, where the water goes to the bottom and the oil rises to the top. These said chambers T and $T^4$ gradually fill with oil and water, and finally oil and water, mostly oil, flow through the stand-pipe h' and are caught in trapped chamber $T^5$, whence they are drawn off through pipe $P^{10}$, as previously stated. In the meantime some of the oil entering chamber $T^4$ with steam has been carried up by the steam through the stand-pipe h' and submitted to the action of the deflector j and the bafflers $h^2$ $h^3$, &c., and has thus increased the amount of oil in trapped chamber $T^5$ to pass off through pipe $P^{10}$. Also in the meantime water from the water beneath the oil in tanks T and $T^4$ has risen in flow-pipe $P^{11}$ to a point determined by ring-gate $N^2$, as above described. This will be seen in water-gage R, and so, too, water-gage R' will show mostly water in the stand-pipe of the digester. The garbage is now supposed to be cooked and mostly free from oil; but the garbage or "tankage," as it is now called, is further treated by washing, as follows: Valve $V^8$ in pipe $P^8$ and valve $V^{14}$ in pipe $P^{14}$, as well as valve $V^7$ in pipe $P^7$, are open. Valve $V^2$ in pipe $P^2$ is gradually opened sufficiently to operate the injector I, which keeps up a circulation from the mouth-nozzles n and $n^2$ of the injector through central pipe $P^6$, the main chamber of the digester, the stand-pipe E, chamber e, pipe $P^7$, chambers $T^4$ and T, (oil here separating from water and passing up through stand-pipe h',) the water continuing through flow-pipe $P^{11}$ and pipe $P^8$ to the chamber $I^2$ of the injector. This chamber also receives water from pipe $P^{14}$.

This process differs from that carried on by apparatus described in my said former patent, No. 709,836 in using a very much larger amount of water and continuously passing the same through the digester, whereby it carries with it out of the digester at each instant a slight film of oil or grease; but at the end of seven or eight hours these slight films substantially fill the chamber T $T^4$, where they will be held above water, which will have passed through the digester many times, until finally the water in T $T^4$ has so increased in volume as to force the oil above it through stand-pipe h' into trapped chamber $T^5$, whence it passes off or is drawn off through pipe $P^{10}$. The oil that has been carried, as it were, from the digester bodily by the increasing volume of water will have passed up through standpipe $h'$ above chamber $T\ T^4$ and into trapped chamber $T^5$ and thence have been drawn off through pipe $P^{10}$.

The large supply of water that is needed in the digester is kept up by the injector $I^2$, fed by water of circulation which has passed out of chamber $e'$ by pipe $P^7$ and returned through pipe $P^8$, and also when necessary by water from pipe $P^{14}$.

Conforming to the rules of the Patent Office requiring division between apparatus and method or process claims, I in this application make no claim to the apparatus herein described, the same being fully claimed in a companion application filed November 11, 1903, Serial No. 180,747.

What I do claim as new and useful, and desire to secure by Letters Patent of the United States, is—

1. The herein-described process of removing oil or grease from garbage or offal, which consists in cooking said garbage or offal by introducing under pressure water and fresh steam into the mass of said garbage or offal and by heat radiated from the center of said mass outward, continuously increasing the volume of the water by a condensation of said steam and water from an independent source, continuously trapping the said oil or grease and water apart from the solid parts of said garbage or offal, continuously separating said trapped oil or grease from the said trapped water and returning the separated water to the original mass of garbage or offal, regulating the flow of the trapped oil or melted grease and the return of the separated water to the original mass by the amount of water so separated, substantially as described.

2. The herein-described process of removing oil or grease from garbage or offal, which consists in cooking said garbage or offal by introducing under pressure water and fresh steam into the mass of said garbage or offal, continuously increasing the volume of the water by a condensation of said steam and water from an independent source, continuously trapping the said oil or grease and water apart from the solid parts of said garbage or offal, continuously separating said trapped oil or grease from the said trapped water and returning the separated water to the original mass of garbage and offal, regulating the flow of the trapped oil or melted grease and the return of the separated water to the original mass by the amount of water so separated, substantially as described.

3. The herein-described process of removing oil or grease from garbage or offal, which consists in cooking the said garbage or offal by introducing under pressure water and fresh steam into the mass of said garbage or offal, increasing the volume of the water by condensation of said steam and water from an independent source, trapping the said oil or grease and water apart from the solid parts of said garbage or offal, continuously separating the said trapped oil or grease from the said trapped water, and regulating the flow of the trapped oil or melted grease by the amount of separated water, substantially as described.

CHARLES S. WHEELWRIGHT.

Witnesses:
WILLIAM W. SWAN,
IDA E. HANDREN.